United States Patent [19]
Wada et al.

[11] 4,396,982
[45] Aug. 2, 1983

[54] MICROINSTRUCTION CONTROLLED DATA PROCESSING SYSTEM INCLUDING MICROINSTRUCTIONS WITH DATA ALIGN CONTROL FEATURE

[75] Inventors: Kenichi Wada, Zama; Mamoru Hinai, Hatano, both of Japan

[73] Assignee: Hitachi, Ltd., Tokyo, Japan

[21] Appl. No.: 208,250

[22] Filed: Nov. 19, 1980

[30] Foreign Application Priority Data

Nov. 19, 1979 [JP] Japan .............................. 54/148892

[51] Int. Cl.³ .............................................. G06F 9/30
[52] U.S. Cl. .................................................. 364/200
[58] Field of Search ... 364/200 MS File, 900 MS File

[56] References Cited
U.S. PATENT DOCUMENTS 3,858,183 12/1974 Amdahl et al. ..................... 364/200
4,135,242 1/1979 Ward et al. ......................... 364/200
4,317,170 2/1982 Wada et al. ......................... 364/200

*Primary Examiner*—Raulfe B. Zache
*Attorney, Agent, or Firm*—Antonelli, Terry & Wands

[57] ABSTRACT

The alignment of data as required in an L-stage is carried out with a first aligner which is controlled by a wired logic for exclusive use, while the alignment of data as required in an E-stage is carried out with a second aligner which is controlled by a microinstruction. Regarding those among macroinstructions which need to fetch storage operands in only the L-stages, the alignment of the storage operand is carried out by means of the first aligner. On the other hand, in the execution of macroinstructions which need to fetch storage operands in both the L-stages and the E-stages, the storage operands fetched in the L- and E-stages are respectively aligned by means of the first and second aligners.

11 Claims, 18 Drawing Figures

| SIGNAL ON LINE 90"A | SIGNAL ON LINE 32B | DATA ON LINE 38A | DATA ON LINE 38B |
|---|---|---|---|
| 0 | 0 | 0 | +8 |
| 0 | 1 | +8 | 0 |
| 1 | 0 | 0 | −8 |
| 1 | 1 | −8 | 0 |

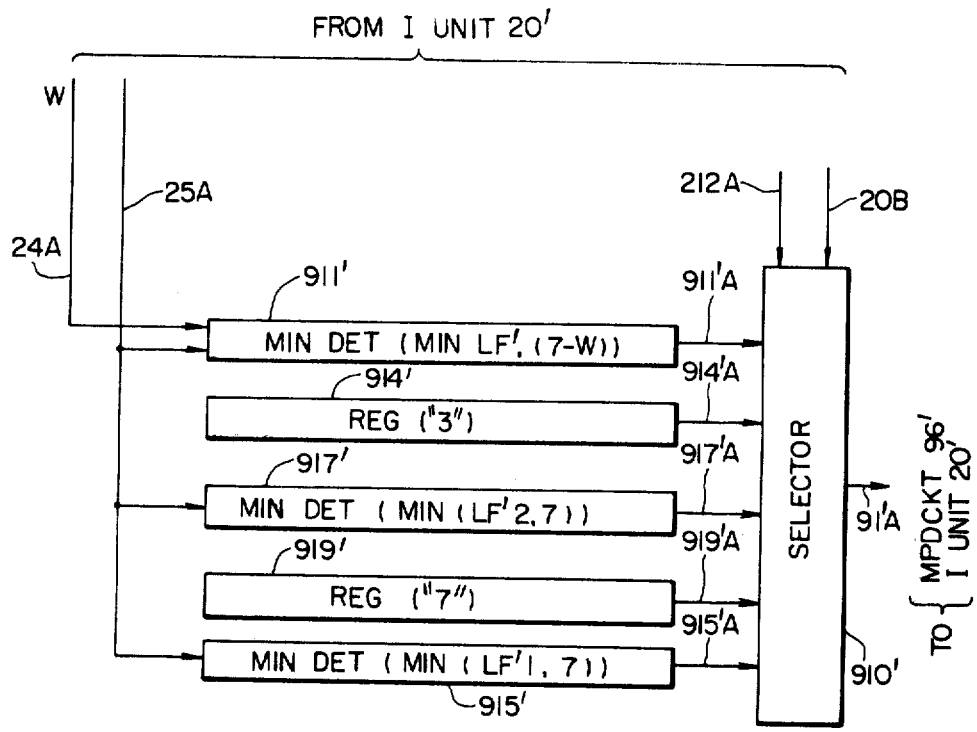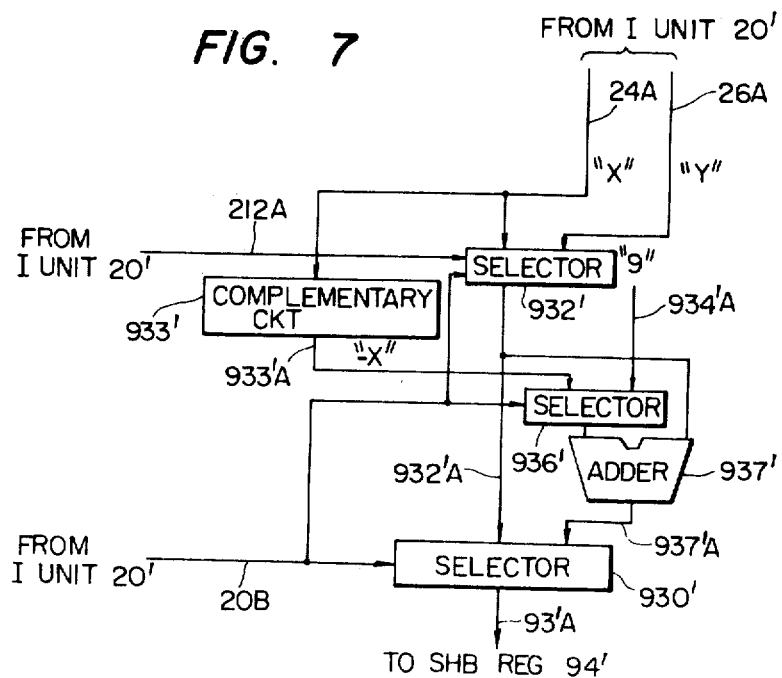

| OUTPUT OF CKT 91' | OUTPUT OF LEFT PATTERN GENERATOR 962' | OUTPUT OF RIGHT PATTERN GENERATOR 964' |
|---|---|---|
| 0 0 0 | 1 0 0 0 0 0 0 0 | 0 0 0 0 0 0 0 1 |
| 0 0 1 | 1 1 0 0 0 0 0 0 | 0 0 0 0 0 0 1 1 |
| 0 1 0 | 1 1 1 0 0 0 0 0 | 0 0 0 0 0 1 1 1 |
| 0 1 1 | 1 1 1 1 0 0 0 0 | 0 0 0 0 1 1 1 1 |
| 1 0 0 | 1 1 1 1 1 0 0 0 | 0 0 0 1 1 1 1 1 |
| 1 0 1 | 1 1 1 1 1 1 0 0 | 0 0 1 1 1 1 1 1 |
| 1 1 0 | 1 1 1 1 1 1 1 0 | 0 1 1 1 1 1 1 1 |
| 1 1 1 | 1 1 1 1 1 1 1 1 | 1 1 1 1 1 1 1 1 |

FIG. 10

| OP CODE 20B | LINE 212A | SELECTOR 910' | SELECTOR 932' | SELECTOR 936' | SELECTOR 930' | SELECTOR 960' | USAGE |
|---|---|---|---|---|---|---|---|
| 00~4F | * | 919'A | 26A | * | 932'A | 962'A | |
| 50~7F | * | 914'A | " | " | " | " | LOAD INSTRUCTION |
| 80~82 | * | 919'A | " | " | " | " | |
| 83~BF | * | 914'A | " | " | " | " | |
| C0~D1 | * | 911'A | " | * | * | * | |
| D2~D4 | * | " | " | 933'A | 937'A | 966'A | MVC INSTRUCTION |
| D5 | 0 | " | 24A | * | 932'A | 962'A | CLC INSTRUCTION |
|  | 1 | " | 26A | * | " | " | |
| D6~D7 | * | " | " | 933'A | 937'A | 966'A | OC/XC INSTRUCTION |
| D8~DE | * | " | 24A | * | 932'A | 962'A | ED INSTRUCTION |
| F0~FF | 0 | 915'A | " | 934'A | 937'A | 964'A | AP/SP INSTRUCTION |
|  | 1 | 917'A | 26A | " | " | " | |

\* DON'T CARE

| 23A | 212A | 800 | SELECTOR 282 |
|-----|------|-----|--------------|
| 0 | 0 | X | 260Z |
| 0 | 1 | X | 240Z |
| 1 | X | 0 0 | 246Z |
| 1 | X | 0 1 | 266Z |
| 1 | X | 1 X | 274Z |

X<br>X } DON'T CARE

FIG. 17

| ALIGN FIELD | | | | DECODER 98 | SELECTOR 910 | SELECTOR 932 | SELECTOR 936 | SELECTOR 930 | SELECTOR 960 | USAGE |
|---|---|---|---|---|---|---|---|---|---|---|
| 0 | 0 | 0 | 0 | X | X | X | X | X | X | |
| 0 | 0 | 0 | 1 | "0" | 913A | X | X | "Y" | 962A | WORD OVERLAP PROCESSING |
| 0 | 0 | 1 | 0 | "0" | "0" | "Y" | "-X" | "Y-X" | " | TR INSTRUCTION |
| 0 | 0 | 1 | 1 | "0" | "0" | "Y" | "13" | "Y+13" | " | NI INSTRUCTION |
| 0 | 1 | 0 | 0 | "0" | 911A | "Y" | "-X" | "Y-X" | 966A | MVC INSTRUCTION |
| 0 | 1 | 0 | 1 | "0" | 919A | "Y" | X | "Y" | 962A | INTERRUPTION PROCESSING |
| 0 | 1 | 1 | 0 | "0" | 72A | "Y" | X | "Y" | " | |
| 0 | 1 | 1 | 1 | "0" | " | "X" | X | "X" | " | |
| 1 | 0 | 0 | 0 | "0" | 911A | "Y" | X | "Y" | " | NC/OC INSTRUCTION |
| 1 | 0 | 0 | 1 | "0" | 913A | "Y" | X | "Y" | " | ED INSTRUCTION |
| 1 | 0 | 1 | 0 | "0" | 72A | X | X | "Z" | " | |
| 1 | 0 | 1 | 1 | "1" | 919A | "Y" | "9" | "Y+9" | 964A | |
| 1 | 1 | 0 | 0 | "1" | 915A | "X" | "9" | "X+9" | " | AP/SP INSTRUCTION |
| 1 | 1 | 0 | 1 | "1" | 917A | "Y" | "9" | "Y+9" | " | AP/SP INSTRUCTION |
| 1 | 1 | 1 | 0 | "1" | "0" | "Y" | "9" | "Y+9" | " | MVO INSTRUCTION |

(NOTE) X : DON'T CARE

MICROINSTRUCTION CONTROLLED DATA PROCESSING SYSTEM INCLUDING MICROINSTRUCTIONS WITH DATA ALIGN CONTROL FEATURE

BACKGROUND OF THE INVENTION

This invention relates to a data processor, such as a digital computer, which processes macroinstructions in an overlapped fashion. More particularly, it relates to a data processor which is constructed so as to permit data to be aligned and selected.

In conventional digital computers, a macroinstruction to be subsequently executed is read out from a memory which stores macroinstructions and data therein, an address for specifying data (hereinbelow, termed the "storage operand") for use in the execution of the particular macroinstruction is obtained from the macroinstruction by means of an instruction unit, the corresponding storage operand is read out from the memory on the basis of the storage operand address, and the particular macroinstruction is executed. In this case, the storage operand which is read out from the memory by one readout operation has a fixed length peculiar to the processor, for example, 8 bytes. Further, it is common practice that the readout of the storage operand from the memory cannot be made on a storage operand of 8 bytes beginning from an arbitrary address position, but that it is made on block data having the length of 8 bytes from a predetermined boundary position between blocks of 8 bytes. Accordingly, in the case where the storage operand desired to be read out is data located on both sides of the boundary position, two readout operations for reading out from the memory 8 bytes having an address smaller than the particular boundary position and 8 bytes having an address greater than the same boundary position are carried out even if the storage operand wished for is shorter than 8 bytes. Thereafter, using an arithmetic and logic unit, the two 8-byte data blocks are aligned so as to permit the desired data of 8 bytes to be selected therefrom. Since in this manner, the conventional processor performs the alignment of data and the selection of data with use of an arithmetic and logic unit, it requires a long processing time. This results in an increase in the processing time of an instruction. In order to eliminate such a disadvantage, data processors in which the alignment of data is effected by a circuit used exclusively for alignment (hereinbelow, called an "align circuit") have been proposed in the following literatures:

1. Specification of Japanese Published Unexamined Patent Application No. 49-95546
2. Specification of Japanese Published Unexamined Patent Application No. 53-94133

In the former, data of 8 bytes including desired data of 4 bytes is read out from a memory, the 8-byte data read out is aligned by the use of a data aligner, and the desired 4-byte data is thereafter selected. Further, in the latter system, data of 16 bytes including desired data of a length within 8 bytes is aligned with a data aligner, whereupon the desired data having the length within 8 bytes is selected.

When the arbitrary alignment of data is made with the data aligner in this way, the processing time of an instruction can be shortened. However, in order to perform the alignment of data during the execution of any of various instructions, the control circuit for the data aligner becomes extremely complicated. In particular, the timing and procedure in which the alignment of data is carried out differ depending upon individual instructions. Accordingly, the control circuit must be constructed so that, for each instruction, the desired operation can be performed at a predetermined timing in the course of the execution of the instruction.

To the end of solving such problem, a technique in which the alignment of data is effected by the use of a microinstruction has been previously proposed and this technique is disclosed in our U.S. Pat. No. 4,317,170, issued on February 23, 1982. According to this technique, the alignment of data can be performed for all macroinstructions by means of a simple device using microinstructions. However, in the case where it is intended to actually apply this technique to a large-sized computer, there occurs the problem that the processing speed of the macroinstruction lowers due to the use of the microinstructions. Especially in the large-sized computer, the respective macroinstructions are executed in an overlapped manner by a so-called pipeline type advanced control system. More specifically, in such a system the execution of each macroinstruction is divided into a plurality of stages, for example, the four stages of:

(1) D-stage of decoding the macroinstruction and calculating an operand address necessary for the execution of the instruction, (2) A-stage of converting the calculated operand address into a physical address, (3) L-stage of reading out a corresponding operand from a memory by the use of the converted physical operand address, and (4) E-stage of executing an operation with regard to the operand.

Each of the stages from the D-stage to the L-stage is processed within one machine cycle, and the stages of each macroinstruction are processed in parallel with different stages of the other macroinstructions. Among the various stages, the E-stage is controlled by microinstruction. On the other hand, the remaining D-, A- and L-stages are controlled by wired logic circuits designed for that exclusive use.

Accordingly, if the alignment control technique employing microinstructions as previously proposed is introduced into such a conventional system, the stage control circuits for the D-, A- and L-stages must be drastically altered. On the other hand, some of the macroinstructions require storage operands, not only in the L-stages, but also in the E-stages. In the processings of such macroinstructions, accordingly, if the alignment control of the storage operand read out in the E-stage is effected by means of a wired logic circuit which is designed for that exclusive use, the circuit therefor becomes complicated.

In this manner, when the large-sized computer which processes the macroinstructions in the overlapped fashion is provided with the data aligner, the system is inevitably rendered complicated.

SUMMARY OF THE INVENTION

This invention has for its object to eliminate the problems described above and to provide a data processor capable of overlapping and processing macroinstructions in which the alignment of data can be performed at high speed and with a simple control device.

In order to accomplish this object, according to an information processor of this invention, the alignment of data as required in an L-stage is carried out with a first aligner which is controlled by a wired logic circuit designed for that exclusive use, while the alignment of data as required in an E-stage is carried out with a second aligner which is controlled by a microinstruction. Regarding those among macroinstructions which need to fetch storage operands in only the L-stages, the alignment of the storage operand is carried out solely by means of the first aligner. On the other hand, in the execution of macroinstructions which need to fetch storage operands in both the L-stages and the E-stages, the storage operands fetched in the L- and E-stages are respectively aligned by means of the first and second aligners.

BRIEF DESCRIPTION OF THE DRAWINGS

FIG. 6 is a schematic block diagram of a fetch data length decision circuit (FDLDCKT) for use in the device of FIG. 3, FIG. 7 is a schematic block diagram of a shift byte number decision circuit (SHBDCKT) for use in the device of FIG. 3, FIG. 10 is a diagram for explaining the operations of selectors for use in the circuits of FIGS. 6 to 8, FIG. 17 is a diagram for explaining the operation of the circuit of FIG. 13.

DETAILED DESCRIPTION OF THE PREFERRED EMBODIMENT

The present embodiment is applicable to electronic computers of System/370 of International Business Machines Corp. The operation of this system is described in a publication "IBM System/370 Principles of Operation" issued by the corporation. Hereinbelow, accordingly, the explanation of the operation of the aforecited system shall be omitted unless especially required for an understanding of the present invention, and terms used for the system shall be used without giving explanations except for special cases.

Instructions which are used in the information processor according to this invention are broadly classified as "enable overlap" instructions and "disable overlap" instructions. Both of these instructions are similar in that each instruction is executed over four stages, but they differ in that each stage of the former instruction can be executed in one machine cycle, whereas the E-stage of the latter instruction requires more than one machine cycle. Further, among the enable overlap instructions, some instructions operate to fetch storage operands in a buffer memory 40 or main memory 10 at the A-stages thereof, and the others fetch other operands. This invention consists especially in the technique of circuit concerning the fetch of the storage operands, and circuits concerning the fetch of the other operands are the same as in the prior art. Hereinafter, accordingly, circuits which concern the executions of macroinstructions fetching operands other than storage operands will be omitted from illustration or description for the sake of brevity. In the following, there will be illustrated and described circuits relevant to the enable overlap instruction which requests the storage operand fetch at only the A-stage and the disable overlap instruction which makes requests for the storage operand fetches at both the A-stage and the E-stage.

An example of the former is a load (L) instruction, and examples of the latter are instructions of the storage-to-storage (SS) format, such as a move character (MVC) instruction and decimal instructions (add decimal (AP) instruction and subtract decimal (SP) instruction).

Figure 1:
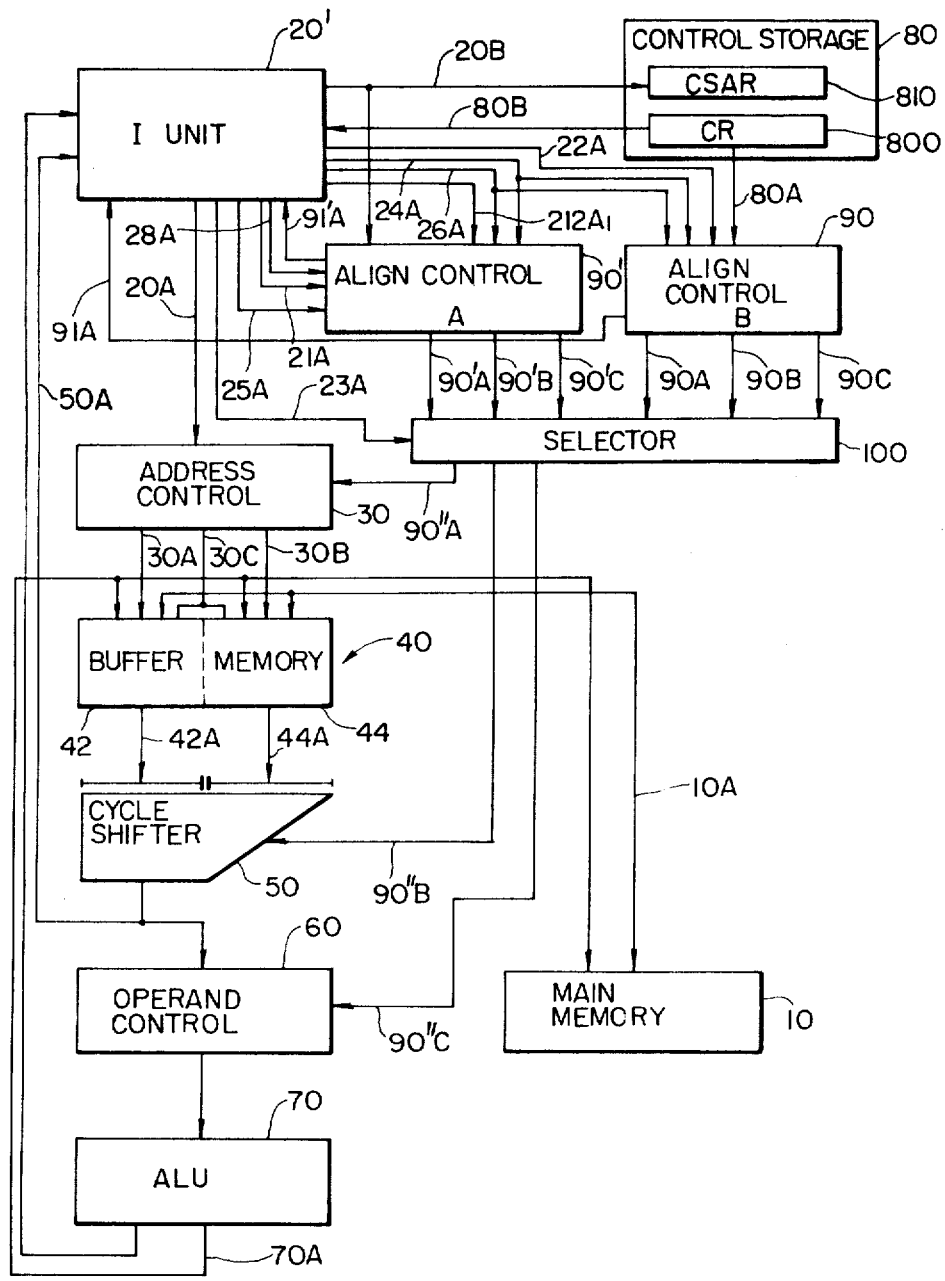
FIG. 1 is a schematic circuit diagram of a data processor according to this invention.

FIG. 1 is a block diagram of the data processor according to this invention. The data processor is constructed of the main memory 10 and the buffer memory 40 which store a plurality of macroinstructions and data therein, an instruction unit (I unit) 20' for controlling the decoding and executing stages of the macroinstruction, an address control 30 for converting a virtual address from the I unit 20' into a real address, a cycle shifter 50 for shifting an output of the buffer memory 40 leftwards every byte, an operand control 60 for masking an output of the shifter 50, an arithmetic and logic unit (ALU) 70, a control storage 80 which stores therein microinstructions for controlling the executions of the macroinstructions, two align controls 90 and 90' for controlling the alignments of the data read out from the buffer memory 40, and a selector 100 for selecting outputs of these align controls.

Among the blocks shown in FIG. 1, the main memory 10, the address control 30, the buffer memory 40, the cycle shifter 50, the operand control 60, the ALU 70, the control storage 80 and the align control 90 have substantially the same circuit arrangements as those corresponding elements described in U.S. Pat. No. 4,317,170 cited previously.

In FIG. 1, features characteristic of this invention are the provision of the align control 90' and the selector 100 and the fact that depending upon the execution stages of the macroinstructions, the align controls 90 and 90' are changed-over for use in the system. A further feature relates to the fact that the I unit 20' is constructed so as to permit the overlap processings of the instructions to be executed.

The align controls 90' and 90 are used for aligning and selecting the data read out at the L-stage and the E-stage respectively.

Before the detailed description of the system of this invention, the outline of the operation thereof will be described.

As will be stated later, a plurality of macroinstructions read out from the buffer memory 40 are transmitted to the I unit 20' through the cycle shifter 50.

These plurality of macroinstructions are processed in an overlapped fashion by the I unit 20' unless they are disable overlap instructions. More specifically, assuming that the D-, A-, L- and E-stages of the first macroinstruction are respectively executed in first, second, third and fourth machine cycles, then the D- to E-stages of the second macroinstruction succeeding the first macroinstruction are respectively executed in the second to fifth machine cycles, and the D- to E-stages of the third macroinstruction succeeding the second macroinstruction are respectively executed in the third to sixth machine cycles. Likewise, the subsequent macroinstructions are processed in the overlapped fashion. However, if the first macroinstruction is a disable overlap instruction, the start of the D-stage of the succeeding second macroinstruction is prevented until the E-stage of the first macroinstruction ends.

In executing the disable overlap instruction, two storage operand addresses are involved. As to the processing of each operand, the D-, A-, L- and E-stages as above stated are executed. More specifically, regarding one operand concerned with the execution of the particular instruction, the D-, A- and L-stages are executed in respective machine cycles, one cycle for each stage, and in parallel with them and with each delay of one machine cycle, the D-, A-, L- and E-stages with regard to the other operand concerned with the execution of the instruction are executed. That is, the disable overlap instruction has, first and second D-stages, first and second A-stages, first and second L-stages and a single E-stage.

The case where, in the A-stage of each macroinstruction, a storage operand is fetched into the buffer memory 42, the virtual address of this operand is transferred to the address control 30 through a line 20A. The buffer memory 40 consists of two areas 42 and 44. The address control 30 converts the virtual address from the I unit 20' into a physical address, and simultaneously reads out two 8-byte operands for forming an operand of a continuous 16 bytes, from the respective areas 42 and 44 of the buffer memory 40. The operand of 16 bytes read out from the buffer memory 40 is shifted leftwards a desired number of bytes by means of the cycle shifter 50, to control the front position of the operand. Thereafter, those byte positions in the output of the cycle shifter 50 which are other than byte positions including a desired operand are masked in the operand control 60, whereupon the desired operand is sent to the ALU 70.

While the storage operand fetch request developed in the A-stage is processed as stated above, the address control 30, the cycle shifter 50 and the operand control 60 are controlled by the align control 90' which is selected by the selector 100.

In the case where the macroinstruction to be executed is an instruction of the so-called storage-to-storage (SS) format, the storage operand fetch request is made, not only in the A-stage, but also in the E-stage. The processing of the storage operand fetch request having developed in the A-stage is controlled by the align control 90' as in the case of the enable overlap instruction. In contrast, when the storage operand fetch request having occurred in the E-stage is to be processed, the selector 100 selects the align control 90, which controls the address control 30, the cycle shifter 50 and the operand control 60.

In this way, the storage operand fetch in the A-stage is controlled by the align control 90'. Since this align control is controlled by the I unit 20' formed of a wired logic circuit, the storage operand fetch is processed at high speed. Accordingly, the overlap processing with other instructions is permitted.

On the other hand, the storage operand fetch in the E-stage with regard to the macroinstruction which requests the memory operand fetches in both the A-stage and the E-stage is performed by the align control 90 which is controlled by the macroinstruction, and the align control 90 can be realized with a simple circuit.

Hereunder, the system of this invention will be described more in detail.

Figure 2:
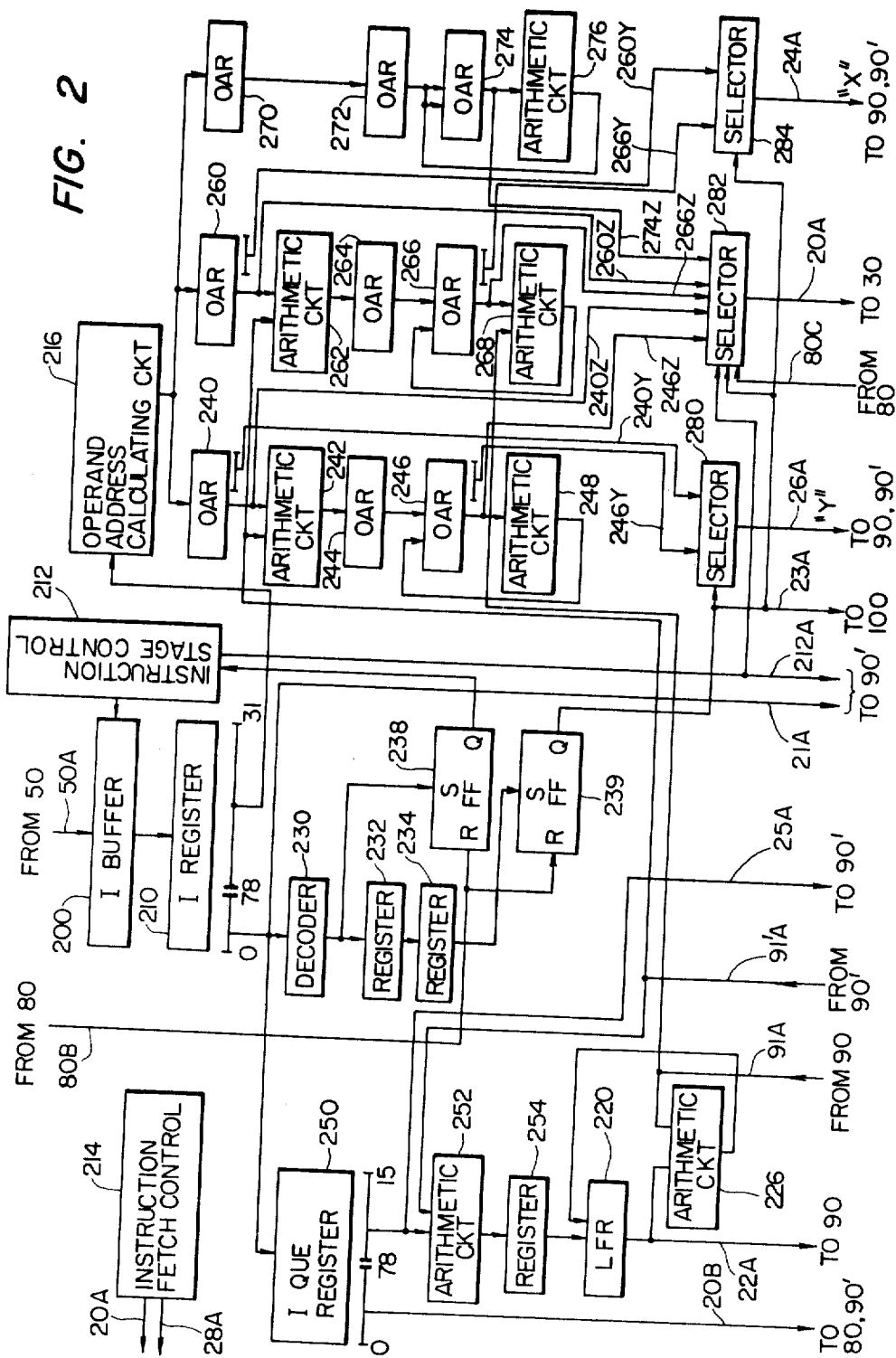
FIG. 2 is a schematic circuit diagram of an instruction unit for use in the system of FIG. 1.
Figure 3:
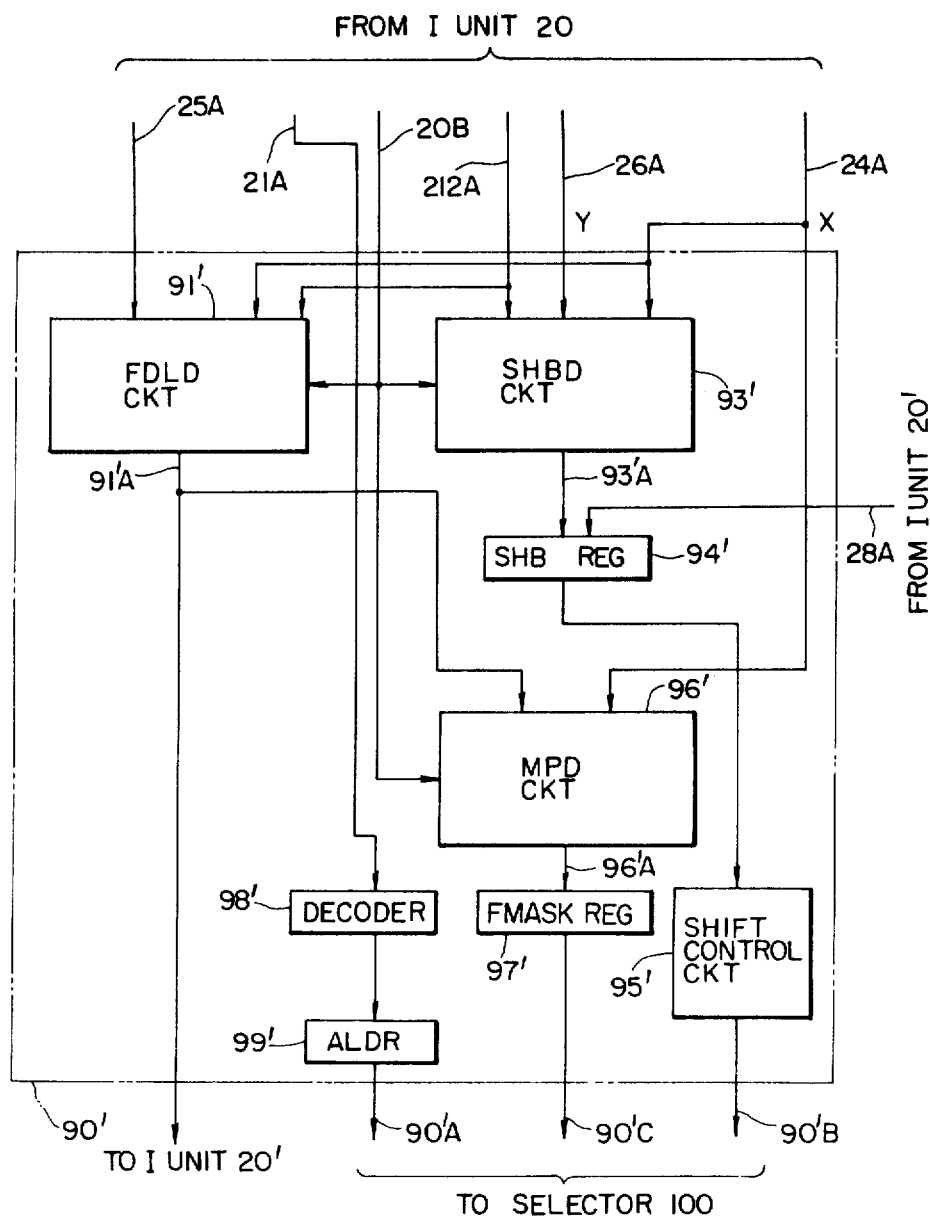
FIG. 3 is a schematic circuit diagram of a first align control for use in the system of FIG. 1.

Referring to FIG. 1, the I unit 20' transmits a virtual address of 32 bits for reading out a macroinstruction to be subsequently executed from the buffer memory 40, from an instruction fetch control 214 (FIG. 2) through the line 20A to the address control 30. In response to the virtual address, the address control 30 delivers a physical address of 32 bits for the buffer memory 40 onto a line 30A or 30B. The buffer memory 40 consists of first and second banks 42 and 44. The first and second banks 42 and 44 deliver stored information, each having a length of 8 bytes, onto lines 42A and 42B in response to the physical addresses on the lines 30A and 30B respectively. In the case where the macroinstruction to be read out is stored in the first bank 42 of the buffer memory 40, the cycle shifter 50 having a length of 16 bytes transmits the macroinstruction provided from the first bank 42, to the I unit 20' through a line 50A without performing any shift operation. In the case where the macroinstruction to be read out is stored in the second bank 44, the cycle shifter 50 shifts the macroinstruction provided from the second bank 44 leftwards by the amount of 8 bytes and then transmits it to the I unit 20' through the line 50A. The shift magnitude of the cycle shifter 50 at the readout of the macroinstruction is sent to the align control 90' through a line 28A by means of the I unit 20'. As illustrated in FIG. 3, the align control 90' stores the shift magnitude into a shift byte number register (SHBREG) for storing the shift magnitude therein, and it supplies the cycle shifter 50 with a signal for commanding it to perform a corresponding shift operation through a line 90'B by means of a shift control circuit 95'.

If the predetermined macroinstruction is not stored in the buffer memory 40, the particular macroinstruction is transmitted to the buffer memory 40 through a line 10A from the main memory 10 having a capacity of 4 megabytes, whereupon the same processings as in the above are performed. All addresses for the access to the main memory 10 are supplied by output lines 30A–30C of the address control 30. For the sake of brevity, address lines leading to the main memory are omitted in FIG. 1. In this way, the plurality of macroinstructions are read out from the buffer memory 40. Referring to FIG. 2, the plurality of macroinstructions read out from the buffer memory 40 are stored in an instruction buffer (I buffer) 200. Among these macroinstructions, one macroinstruction to be executed is stored into an instruction register (I register) 210 having a length of 4 bytes under the control of a known instruction stage control 212. The D-stage of each macroinstruction starts when the instruction is set in the I register 210.

The instruction other than the SS instruction has a length of 2 bytes or 4 bytes. The SS instruction has a length of 6 bytes. In setting the SS instruction into the I register 210, only the 4 bytes on the more significant side are first set. The I register 210 has a length of 4 bytes. Within the length, a 1-byte field on the most significant side is the field of an operation code (OP code). Regarding the instruction other than the SS format, data for assigning an operand address is stored in the remaining 3-byte field of the I register 210. Regarding the instruction of the SS format, data of the length of an operand is stored in a 2-byte field on the more significant side. The remaining 2-byte field is a field for assigning an operand address.

In the D-stage of the macroinstruction, a decoder 230 decodes the OP code in order to know whether this macroinstruction is the disable overlap instruction or not.

When, as the result of the decoding, the macroinstruction has been found to be the disable overlap instruction (SS instruction), a "1" output from the decoder 230 sets an R-S flip-flop (FF) 238. In response to a set output of the FF 238, the instruction sequence controller 212 stores the remaining 2 bytes of the SS instruction into the position of 2 bytes on the less significant side of the I register 210 in the next machine cycle. Thus, the SS instruction is processed as if it were two instructions of 4 bytes. During the execution of the SS instruction, the subsequent macroinstructions are inhibited from being delivered from the I buffer 200 to the I register 210, and their D-stages are not started. Registers 232 and 234 serve to shift the output of the decoder 230 sequentially every machine cycle. The registers 232 and 234 accordingly hold the output of the decoder 230 in the A- and L-stages of the macroinstruction previously stored in the I register 210, respectively. A "1" output from the register 234 is used to set an FF 239. An output of the FF 239 is used in the E-stage of each instruction as will be described later.

When, as the result of the decoding in the decoder 230, it has been found that the macroinstruction in the I register 210 is not the disable overlap instruction, "0" is provided from the decoder 230, and the FF 238 is not set. In the next machine cycle, accordingly, the subsequent macroinstruction is set from the I buffer 200 into the I register 210 under the control of the instruction sequence control 212. Thereafter, macroinstructions are stored into the I register 210 similarly and successively at intervals of 1 machine cycle.

An instruction queue (I Que) 250 is a register queue which serves to store 2 bytes of the first half of each of the instructions successively stored in the I register 210, with a lag of 1 machine cycle. The I Que 250 accordingly provides 2 bytes on the more significant side of the macroinstruction stored in the I register 210 previously, at the A-stage of this macroinstruction. In an output of the I Que 250, 1 byte on the more significant side is an OP code, which is stored into a control storage address register (CSAR) 810 (FIG. 1) within the control storage 80 (FIG. 1) at the L-stage and which is used at the E-stage.

In the output of the I Que 250, 1 byte on the less significant side is a length field concerning the data length of an operand as is used at the execution of the macroinstruction of the SS format.

Arithmetic circuits 252 and 226 and length field registers (LFRs) 254 and 220 are circuits which operate in response to the length field provided from the I Que 250. The length field provided from the I Que 250 at the A-stage of each instruction passes through the arithmetic circuit 252 to be stored into the LFRs 254 and 220 at the L- and E-stages of the instruction respectively. The details of the operation of the circuit arrangement composed of these constituents will be described later.

On the other hand, at the D-stage of the instruction stored in the I register 210, the second to fourth bytes of the particular instruction are sent to a known operand address calculating circuit 216, which provides a storage-operand virtual address consisting of 24 bits. When this address indicates the address of an operand to be read out from the buffer 40, it is stored into an operand address register (OAR) 260. When this address indicates an address to write an operand into the buffer 40 thereat, it is stored into an OAR 270. Further, when the instruction needs the readout of a second operand, the address is stored into an OAR 240. Here, the address which is provided by the operand address calculating circuit is the front address of the operand.

Herein, the expression "front address of the operand" signifies either a smaller value (hereinbelow, called "leftmost address") or a larger value (hereinbelow, called "rightmost address") between the addresses on both the ends of the operand for prescribing the particular operand. Which of these addresses the front address corresponds to is determined depending upon instructions, and the decimal operation instructions correspond to the latter and the other SS instructions to the former.

The content of the OAR 270 is shifted to OARs 272 and 274 successively every machine cycle. Further, the content of the OAR 274 is thereafter revised by an arithmetic circuit 276 as will be described later.

Also the content of the OAR 260 is revised by an arithmetic circuit 262 and is thereafter shifted to OARs 264 and 266 every machine cycle. The content of the OAR 266 is thereafter revised by an arithmetic circuit 268.

Also the content of the OAR 240 is revised by an arithmetic circuit 242 and is thereafter shifted to OARs 244 and 246. Also the content of the OAR 246 is thereafter revised by an arithmetic circuit 248.

Figures 16, 18:
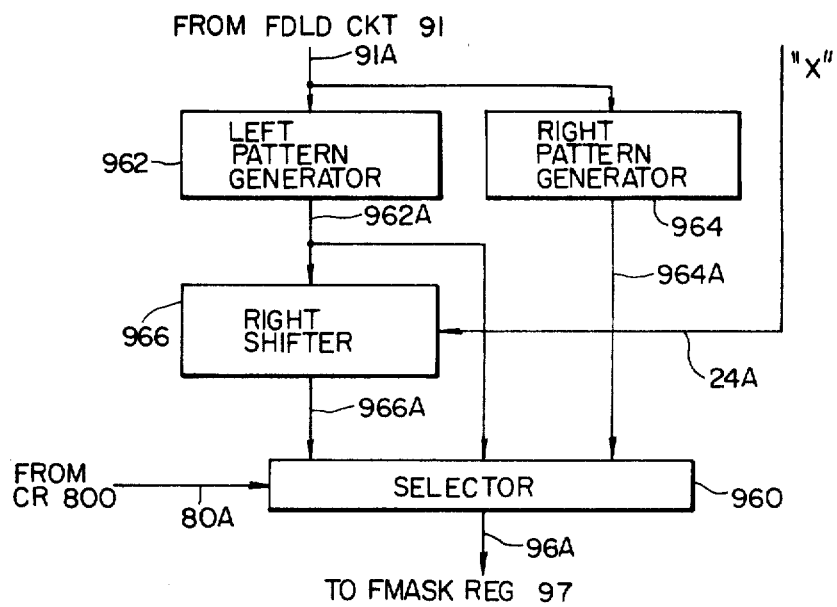
FIG. 16 is a schematic block diagram of a mask pattern decision circuit (MPDCKT) for use in the device of FIG. 13.
FIG. 18 is a diagram for explaining the operation of a selector for use in the circuit of FIG. 2.

As illustrated in FIG. 18, a selector 282 selects the operand address of any of the OARs 240, 246, 260, 266 and 274 and sends it to the address control 30 through the line 20A.

A selector 284 selects the lower 4 bits of the operand address in the OARs 266 and 260 and sends them to the align controls 90 and 90'.

A selector 280 selects the lower 4 bits of the operand address in the OARs 240 and 246 and sends them to the align controls 90 and 90'.

Figures 4, 5:
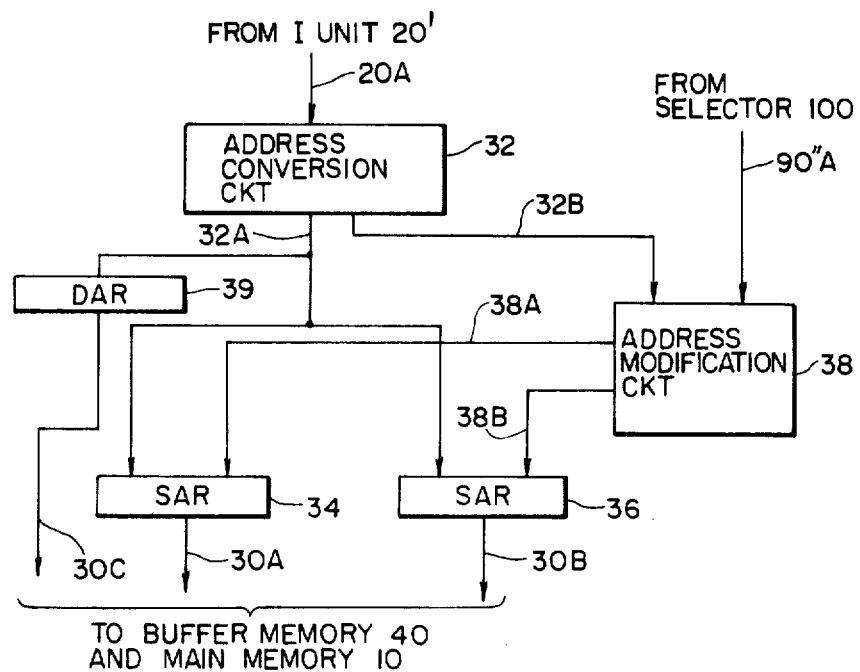
FIG. 4 is a schematic circuit diagram of an address control for use in the system of FIG. 1.
FIG. 5 is a diagram for explaining the operation of an address modification circuit for use in the device of FIG. 4.

As shown in FIG. 3, in the align control 90', a decoder 98' decodes the OP code applied through a line 21A from the I register 210 within the I unit 20' and discriminates the alignment direction of the operand supplied from the selector 282, that is, whether the address of this operand is the leftmost address or the rightmost address thereof. Since whether or not the operand address indicates the leftmost address is determined depending upon the macroinstruction in advance, the aforecited discrimination is permitted by decoding the OP code of the particular macroinstruction. In the case where the operand address indicates the rightmost address as in, for example, the decimal operation instruction, the decoder 98' provides "1", and in any other case, it provides "0". The output provided is stored into an alignment direction register (ALDR) 99'. An output from the ALDR 99' is sent to the address control 30 (FIG. 1) through a line 90'A, the selector 100 and a line 90"A at the L-stage of each instruction. Likewise, the alignment direction of the storage operand required at the E-stage of each instruction is sent from the align control 90 to the address control 30 through a line 90A, the selector 100 and the line 90"A. The details of the address control 30 are shown in FIG. 4. The operand virtual address of 32 bits applied through the line 20A from the I unit 20' is converted into the corresponding operand real address of 32 bits by a known address conversion circuit 32, and the real address is applied to source address registers (SARs) 34 and 36 through a line 32A. On the other hand, the fourth bit of the operand real address as reckoned from the least significant bit is sent to an address modification circuit 38 through a line 38B. In response to the signal on the line 90"A applied from the align control 90' or 90 and the signal on the line 32B applied from the address conversion circuit 32, the address modification circuit 38 delivers binary data of 4 bits indicative of any of "0", "+8" and "−8" onto lines 38A and 38B on the basis of a relationship illustrated in FIG. 5 and adds these data to the operand real address already stored in the SARs 34 and 36. Since a concrete circuit arrangement of the address modification circuit 38 can be readily realized by one skilled in the art by referring to FIG. 5, further description is omitted. In order to effect the additions, the SARs 34 and 36 are constructed of counters or constructed of units having adders therein.

The SARs 34 and 36 are used for reading out data of 16 bytes located in address areas successive to each other, each including data of 8 bytes, from the first and second banks 42 and 44 respectively.

The operation of the circuit 38 has the following significance. The addressings of the first and second banks 42 and 44 of the buffer memory 40 are alternately made in 8 bytes. More specifically, in the case where the addresses are 0–7, 16–23, 32–39, . . . in the decimal notation, the data corresponding to these addresses is stored in the first bank 42, and in the case where the addresses are 8–15, 24–31, 40–47, . . . in the decimal notation, the data corresponding to these addresses is stored in the second bank 44. Accordingly, when the addresses are indicated in the binary system, the data corresponding to the addresses in each of which the fourth bit reckoned from the least significant bit thereof (delivered onto the line 32B) is "0" or "1" are stored in the first bank 42 or the second bank 44 respectively. Consequently, in the case where the signal on the line 90"A is "0", the address on the line 32A indicates the leftmost address of the data to be read out, and hence, (i) when the signal on the line 32B is "0", the data "0" is delivered onto the line 38A so as to hold the address within the SAR 34 at the address on the line 32A, and simultaneously, the data "8" is delivered onto the line 38B so as to bring the address within the SAR 36 into a value with "8" added to the address on the line 32A. On the other hand, (ii) when the signal on the line 32B is "1", the data "0" is delivered onto the line 38B so as to hold the address within the SAR 36 at the address on the line 32A, and simultaneously, the data "8" is delivered onto the line 38A so as to bring the address within the SAR 34 into a value with "8" added to the address on the line 32A. Thus, in the SARs 34 and 36, there are stored the addresses for respectively reading out from the first and second banks 42 and 44 of the buffer memory 40 the data each being of 8 bytes for constituting data of successive 16 bytes including data of 8 bytes the leftmost address of which is the address on the line 32A.

In contrast, in the case where the signal on the line 90"A is "1", the address on the line 32A indicates the rightmost address of the data to be read out, and hence, (i) when the signal on the line 32B is "0", the data "0" is delivered onto the line 38A so as to hold the address within the SAR 34 at the address on the line 32A, and simultaneously, the data "-8" is delivered onto the line 38B so as to bring the address within the SAR 36 into a value with "-8" added to the address on the line 32A. On the other hand, (ii) when the signal on the line 32B is "1", the data "0" is delivered onto the line 38B so as to hold the address within the SAR 36 at the address on the line 32A, and simultaneously, the data "-8" is delivered onto the line 38A so as to bring the address within the SAR 34 into a value with "-8" added to the address on the line 32A. Thus, in the SARs 34 and 36, there are stored the addresses for respectively reading out from the first and second banks 42 and 44 of the buffer memory 40 the data each being of 8 bytes for constituting data of successive 16 bytes including data of 8 bytes the rightmost address of which is the address on the line 32A.

Referring to FIG. 1 again, outputs from these SARs 34 and 36 are respectively fed to the first and second banks 42 and 44 of the buffer memory 40 through the lines 30A and 30B to read out the data totaling 16 bytes therefrom. In this way, the data of 16 bytes, including the data of 8 bytes beginning from the operand real address is provided from the buffer memory 40 by one readout operation.

When desired data is not stored in the buffer memory 40, this data instead is transmitted from the main memory 10 to the buffer memory 40, and thereafter, the readout operation above described is carried out.

Figure 11:
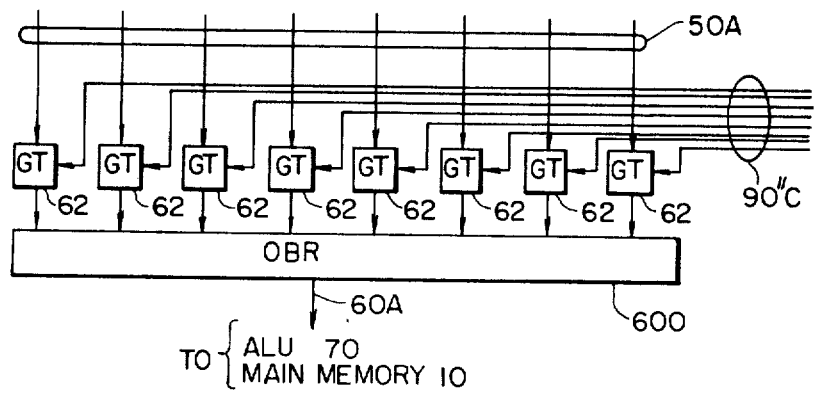
FIG. 11 is a schematic circuit diagram of an operand control for use in the system of FIG. 1.

The data of 16 bytes is sent to the cycle shifter 50 through the lines 42A and 44A. The cycle shifter 50 cycle-shifts the applied data leftwards byte by byte by the number of bytes which is decided by a shift control signal fed through a line 90"B from the selector 100. The align controls 90' and 90 supply lines 90'B and 90B with shift control signals for processing the storage operand fetch requests generated in the A- and E-stages, respectively. The selector 100 selects one of these lines 90'B and 90B. In the align control 90', the shift control signal is given by the shift control circuit 95', as seen in FIG. 3. This circuit 95' receives an output of a shift byte number decision circuit (SHBD CKT) 93' through the shift byte number register (SHB REG) 94', and provides the corresponding shift control signal. The circuit 93' receives the lower 4 bits of the operand addresses from the I unit 20' through lines 24A and 26A respectively, decides the number of shift bytes on the basis of this data and under the control of the OP code fed through a line 20B, and stores the decided number into the SHB REG 94'. As shown in detail in FIG. 7, the circuit 93' is composed of a complement circuit 933', an adder 937' and selectors 930', 932' and 936'. The complement circuit 933' supplies a line 933'A with the 2's complement of data "X" consisting of the lower 4 bits of the operand address, accordingly data "-X" mathematically. The selector 932' selects the line 24A or 26A. The selector 936' selects the data "-X" on the line 933'A or constant data "9" on a line 934'A. The adder 937' evaluates the sum between the outputs of the selectors 932' and 936'. The selector 930' selects either the output of the selector 932' or the output of the adder 937'. All the operations of these selectors 932', 936' and 930' are controlled by the OP code which is applied from the I unit 20' through the line 20B. Further, the selector 932' responds also to a signal on a line 212A supplied from the I unit 20'. The relations between the selecting operations of these selectors and the OP codes are as listed in FIG. 10. In FIG. 10, the usages of the respective OP codes are also indicated. Referring to FIG. 1 again, the cycle shifter 50 cyclically shifts the applied data leftwards a certain number of bytes under the control of the align control 90, and thereafter, it selects the upper 8 bytes of the shifted data and sends them to the operand control 60 through the line 50A. The operand control 60 is as shown in FIG. 11. In response to fetch mask data of 8 bits sent from the selector 100 through lines 90"C, it cuts by means of gates 62 all (data in certain byte positions among) the data applied through the lines 50A. After storing the resultant data in an operand buffer register (OBR) 600, the operand control feeds them to the ALU 70 through a line 60A.

The align controls 90' and 90 supply lines 90'C and 90C with fetch mask data for processing the storage operand fetch requests generated in the L- and E-stages, respectively. The selector 100 selects one of the lines 90'C and 90C. In the align control 90', the fetch mask data is obtained from a mask pattern decision circuit (MPDCKT) 96' through a line 96'A as well as a fetch mask register (FMARK REG) 97' as illustrated in FIG. 3. The circuit 96' responds to an output of a fetch data length decision circuit (FDLDCKT) 91', which decides the length of data to be read out, and also to an output of the lower 4 bits "X" within the operand address, and provides a fetch mask pattern under the control of the OP control which is applied through the line 20B.

The FDLDCKT 91' responds to a length field applied through a line 25A from the I Que 250 in the I unit 20', and decides a fetch data length under the control of the OP code on the line 20B.

As illustrated in detail in FIG. 6, the circuit 91' is composed of minimum value detecting circuits (MIN DETs) 911', 915' and 917', constant registers 914' and 919', and a selector 910' for selecting one of the outputs of the detectors and the registers. The selector 910' is controlled by the OP code applied through the line 20B. The relationship between the OP code and the output of the selector 910' is indicated in FIG. 10. The circuits 911', 915' and 917' are coupled through the line 25A to the length field of the I Que 250 in the I unit 20'. The circuit 911' compares the total data length LF' within the length field with "7−W", and provides a smaller value. Here, "W" denotes data consisting of the lower 3 bits which are obtained by removing the first 1 bit from within the lower 4 bits of the operand address delivered from the selector 284 (FIG. 2). The circuit 915' compares data LF'1 represented by the more significant 4 bits of the data length LF' and "7", and provides the smaller data. The circuit 917' compares data LF'2 constructed of the less significant 4 bits of the data length LF' and "7", and provides the smaller data.

The circuit 911' is selected in the case where the readout data length from the buffer memory 40 may be limited to 8 bytes or less, for example, in the case of the MVC instruction. The circuits 915' and 917' are used in case of the decimal operation instruction and when the first and second operands are to be read out respectively. The REG 914' is selected at, for example, the load instruction and is used for reading out data of 4 bytes irrespective of the value of LF'.

Figures 8, 9:
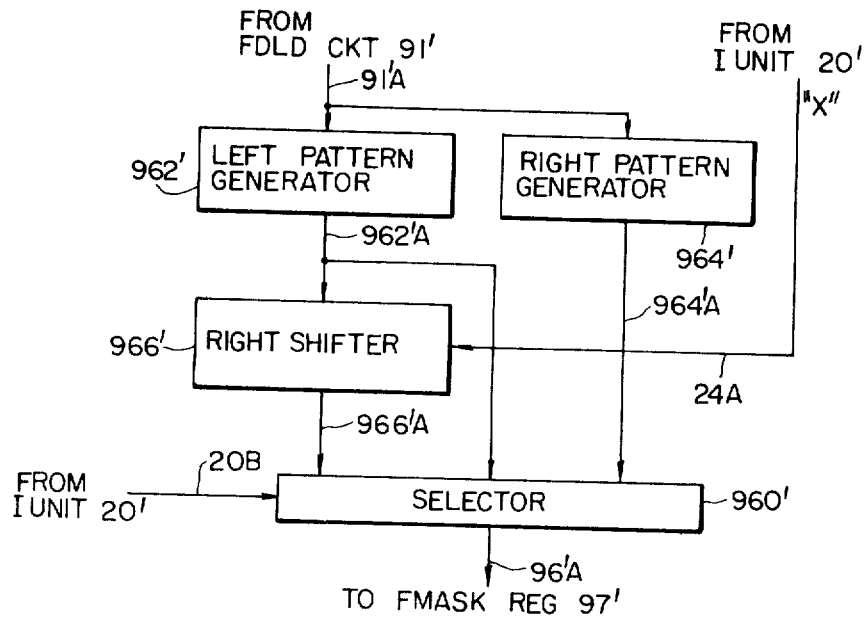
FIG. 8 is a schematic block diagram of a mask pattern decision circuit (MPDCKT) for use in the device of FIG. 3.
FIG. 9 is a diagram for explaining outputs from the circuit of FIG. 8.

As shown in detail in FIG. 8, the MPDCKT 96' (FIG. 3) is composed of a left pattern generator 962' and a right pattern generator 964' to which the output of the FDLDCKT 91' is applied through a line 91'A, a right shifter 966' which serves to shift an output of the left pattern generator 962' rightwards by a magnitude which is represented by data consisting of the lower 3 bits among the lower 4 bits within the OAR 240 as supplied onto the line 24A, and a selector 960' which serves to select outputs of the generators 962' and 964' and the right shifter 966'. The selector 960' is controlled by the OP code on the line 20B. As shown in FIG. 9, the outputs of the generators 962' and 964' are data of 8 bits in which "1" is possessed on the left side and the right side respectively in addition to the number of the fetch data length provided from the FDLD CKT 91' (FIG. 3).

An output from the selector 960' is sent to the FMARK REG 97' (FIG. 3) through the line 96'A, and is stored therein. An output of the FMARK REG 97' is sent to the eight gates 62 within the operand control 60 shown in FIG. 11. In turns off the gates corresponding to "0" in the output of the selector 960', thereby to put into "0" all the data of 1 byte applied to the gates, and it turns on the gates corresponding to "1", thereby to pass all the data of 1 byte applied to the gates as they remain intact. Thus, data is stored in OBR 600 in which only the bytes of desired places are significant are "1" and all the others are "0".

The data stored in the OBR 600 in this way is sent to the ALU 70 through the line 60A.

In the case where the fetch of the storage operand has been requested in the A-stage of a certain instruction, the alignment of this operand is carried out by the align control 90' described above. In the instruction of the SS format, however, the fetches of the storage operands are requested in both the A-stage and the E-stage. In this case, the storage operand fetch request having developed in the A-stage is processed with the align control 90' as in instructions other than the SS format. The storage operand fetch request having developed in the E-stage is processed with the control storage 80 and the align control 90 as in U. S. Pat. No. 4,317,170 referred to previously.

In the processing of the A-stage, the output from the FDLDCKT 91' within the align control 90' is sent to the arithmetic circuit 252 within the I unit 20' through the line 91'. The difference of this output from the length field LF' of the I Que 250 is stored into the LFR 254 in the L-stage, and is further stored into the LFR 220 in the E-stage.

In consequence, the length LF of the storage operand to be fetched in the E-stage is stored in the LFR 220. The data LF is sent to the align control 90 through a line 22A.

Figure 12:
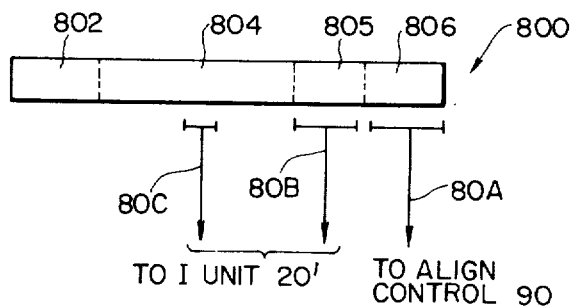
FIG. 12 is a diagram for explaining the arrangement of a control register for use in the system of FIG. 1.

On the other hand, the OP code is applied from the I Que 250 through the line 20B to the control storage address register (CSAR) 810 in the control storage 80 (FIG. 1) in the L-stage preceding the E-stage. The control storage 80 successively reads out microinstructions within a microinstructions sequence assigned by this OP code, and controls the executions of the E-stages of the macroinstructions. Upon reading out one microinstruction, the control storage 80 stores the microinstruction into a control register (CR) 800 (FIG. 12) disposed therein. Each microinstruction has a next address field 802 for assigning a microinstruction to be read out next, a control field 804 for indicating control information for the execution of the instruction, an operation end field 805 for indicating whether or not the operation of the E-stage has ended, and an align field 806 of 4 bits for controlling the alignment and selection of data read out. The field 804 includes a field which points out a write request and a read request in the E-stage, and which is provided through a line 80C. The values "00" and "01" of this field point out the read requests of the second operand and the first operand respectively, and "10" or "11" points out the write of the first operand. The align control 90 receives the align field 806 through a line 80A, and delivers control signals to the address control 30, the cycle shifter 50 and the operand control 60 through the lines 90A-90C respectively.

Figure 13:
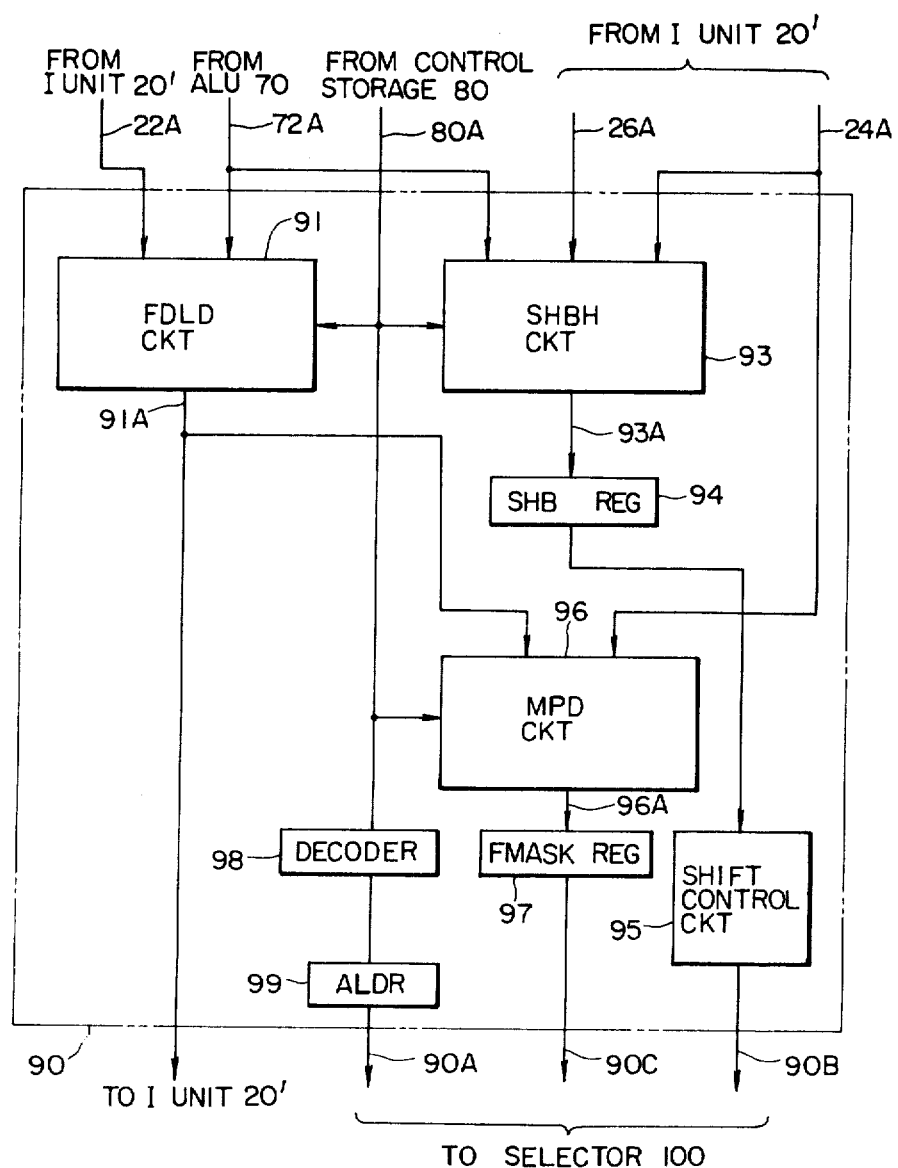
FIG. 13 is a schematic circuit diagram of a second align control for use in the system of FIG. 1.
Figure 15:
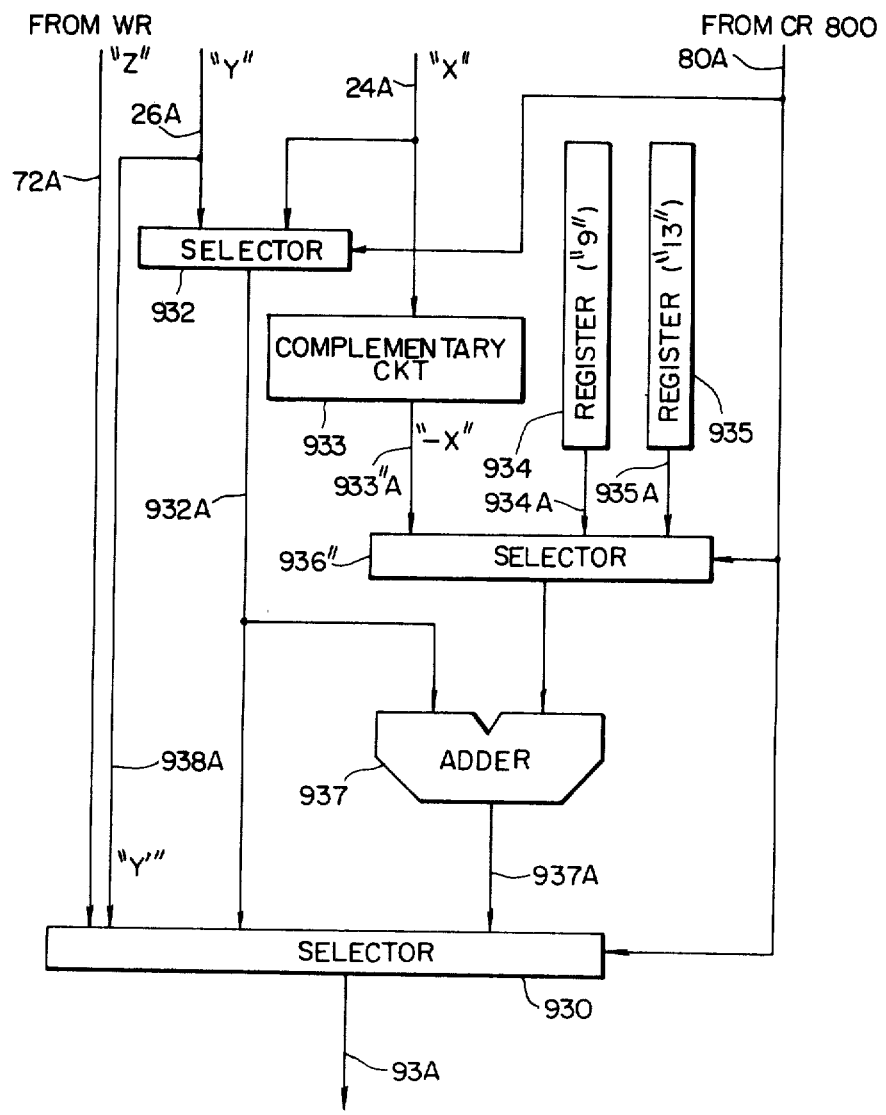
FIG. 15 is a schematic block diagram of a shift byte number decision circuit (SHBDCKT) for use in the device of FIG. 13.

As shown in FIG. 13, in the align control 90, a decoder 98 decodes the align field 806 within the control register 800 so as to discriminate whether the operand address supplied from the I unit 20' is the leftmost address or the rightmost address. Since whether or not the operand address indicates the leftmost address is determined depending upon macroinstructions in advance, the above discrimination is permitted in such a way that the contents of the align fields read out by the macroinstructions are previously decided to be unique in correspondence with the macroinstructions. In the case where the operand address indicates the rightmost address as in, for example, the decimal operation instruction, the decoder 98 provides "1", and in any other case, it provides "0". The output provided is stored into an alignment direction register (ALDR) 99. An output from the ALDR 99 is sent to the address control 30 (FIG. 1) through the line 90A. The align control 90 affords a shift control signal for the cycle shifter 50 in the E-stage by means of a shift control circuit 95. This circuit 95 receives an output of a shift byte number decision circuit (SHBD CKT) 93 through a shift byte number register (SHB REG) 94, and delivers the corresponding shift control signal. The circuit 93 receives the lower 4 bits of the first and second operand addresses supplied from the I unit 20', through the lines 24A and 26A respectively, and also receives data in a work register (WR) 72 (not shown) located within the arithmetic and logical unit (ALU) 70 (FIG. 1). On the basis of this data, it decides the number of shift bytes under the control of the align field 806 in the CR 800 as sent through a line 80A, the decided number being stored into the SHB REG 94. As shown in detail in FIG. 15, the circuit 93 consists of selectors 932, 936 and 930, a complement circuit 933, registers 934 and 935, and an adder 937. The complement circuit 933 provides the 2's complement of data "X" composed of the lower 4 bits of the OAR 24, accordingly data "−X" mathematically. The registers 934 and 935 store therein binary data corresponding to constants "9" and "13", respectively. The selector 932 selects either of the lower 4 bits "X" and "Y" of the OARs 24 and 26, while the selector 936 selects one of outputs of the complement circuit 933 and the registers 934 and 935. The adder 937 evaluates the sum between outputs of the selectors 932 and 936. The selector 930 selects an output "Z" of the WR 72, data "Y'" on a line 938A in which all the lower 3 bits of the data "Y" on the line 26A are made "0", the output of the selector 932, on the output of the adder 937. All the operations of the selectors 932, 936 and 930 are controlled by data in the align field 806 within the CR 82 as supplied through the line 80A. The relations between the selecting operations of the selectors and the align field 806 are as listed in FIG. 17. In FIG. 17, the usages of the respective align fields are also indicated. When the output of the decoder 98 (FIG. 13) is "0", the data provided by the selector 930 correspond to any of "X", "Y", "Y'", "Z", "Y−X", "Y+13" and "Y+9" as indicated in FIG. 17, and when the output of the decoder 98 (FIG. 13) is "1", the data provided by the selector 930 correspond to "Y+9" or "X+9". In processing a certain macroinstruction, accordingly, the data of the align field within a microinstruction sequence for governing the control of the execution of the macroinstruction may be specified in advance according to FIG. 17 so that the number of bytes desired to be shifted may be delivered from the selector 930. The align data, however, must be determined upon specifying also the selecting operation of a selector 960 to be described later. In FIG. 15, in case of selecting the data "Z" of the WR 72, the shift of any desired number of bytes is permitted by determining the data "Z" as is necessary. The align control 90 affords fetch mask data for controlling the operand control 60 in the E-stage, from a mask pattern decision circuit (MPDCKT) 96 shown in FIG. 13 and through a line 96A as well as a fetch mask register (FMARKREG) 97. In response to an output of a fetch data length decision circuit (FDLDCKT) 91 deciding a data length to be read out and to an output of lower 4 bits within the OAR 24, the circuit 96 provides a fetch mask pattern under the control of the align field 806 within the CR 800 as supplied through the line 80A.

The FDLDCKT 91 responds to the outputs of the LFR 220 within the I unit 20' and the WR 72 within the ALU 70, and decides a fetch data length under the control of the align field 806.

Figure 14:
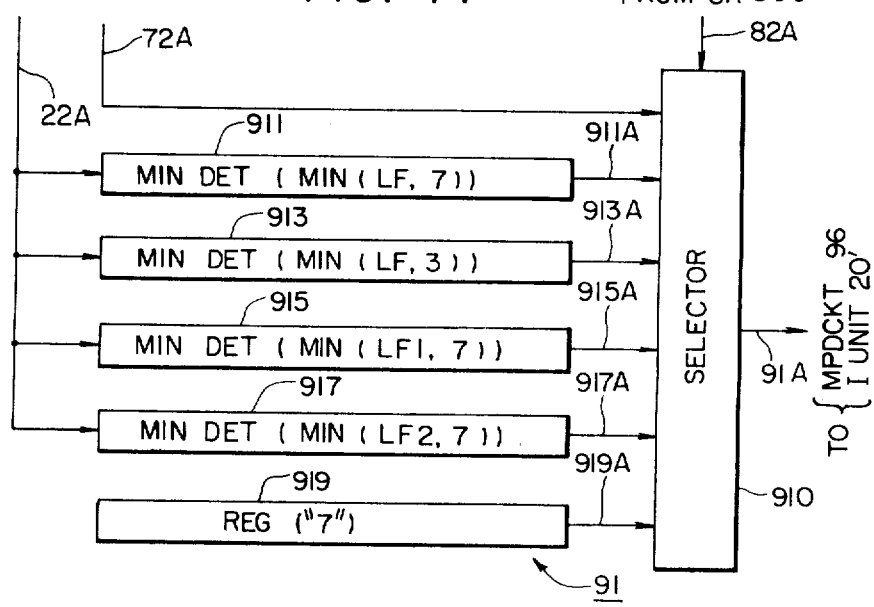
FIG. 14 is a schematic block diagram of a fetch data length decision circuit (FDLDCKT) for use in the device of FIG. 13.

As illustrated in detail in FIG. 14, the circuit 91 is composed of minimum value detecting circuits (MIN DETs) 911, 913, 915 and 917, a constant register 919, and a selector 910 for selecting one of outputs of the detectors and the register or the output on a line 72A from the WR 72. The selector 910 is controlled by the align field 806 within the CR 80 as applied through the line 82A. The relationship between the content of the align field and the output of the selector 910 is indicated in FIG. 17. The circuits 911, 913, 915 and 917 are coupled to the LFR 220 within the I unit. The circuits 911 and 913 compare the total data length LF within the LFR 220 with "7" and "3" respectively, and provide the smaller values. The circuit 915 compares data LF1 represented by the upper 4 bits of the data length LF and "7", and provides the smaller data. The circuit 917 compares data LF2 composed of the lower 4 bits of the data length LF and "7", and provides the smaller data.

The circuit 911 is selected in the case where the data length to be read out from the buffer memory 40 may be limited to 8 bytes or less, for example, in the case of an MVC instruction. The circuit 913 is selected when the data length to be read out from the buffer memory 40 needs to be limited to 4 bytes or less. In the present embodiment, it is selected in executing an instruction which requires a word overlap processing. The circuits 915 and 917 are employed in the case of decimal operation instructions and when the first and second operands are read out respectively. The REG 919 is selected at, for example, an interrupt processing and is used for reading out data of 8 bytes irrespective of the content of the LFR 22. The line 72A is selected in the case where the readout data length is determined with an arbitrary value within the WR 72.

As shown in detail in FIG. 16, the MPDCKT 96 is composed of a left pattern generator 962 and a right pattern generator 964 to which the output of the FDLDCKT 91 is applied through a line 91A, a right shifter 966 which serves to shift an output of the left pattern generator 962 rightwards a magnitude that is represented by data consisting of the lower 3 bits among the lower 4 bits within the OAR 24 delivered onto the line 24A, and a selector 960 which serves to select outputs of the generators 962 and 964 and the right shifter 966. The selector 960 is controlled by the align field 806 within the CR 80 on the line 82A. The generators 962 and 964 and the right shifter 966 have quite the same arrangements as the corresponding components in FIG. 8.

The output of the selector 960 is sent to the FMARK REG 97 (FIG. 13) through the line 96A, and is stored therein. The output of the FMARK REG 97 is sent to the operand control 60 shown in FIG. 11.

When the total length LF of the data to be read out is 8 bytes or less, the readout of the data assigned by the operand real address is ended by one readout operation. In contrast, when the total length LF exceeds 8 bytes, the above readout operation is repeated until the readout of the data having the total length LF is accomplished. More specifically, the output of the FDLD CKT 91 is sent through the line 91A to the subtracter 226 within the I unit 20', and the difference between this output and the value of the LFR 220 is stored in the LFR 220. Unless the resulting content of the LFR 220 is minus, the readout of data is carried out again by the use of the contents of the LFR 220 and the OAR 260 or 240. This readout operation is repeated until the content of the LFR 220 becomes minus.

On the other hand, the I unit 20' transmits the operand virtual address stored in the OAR 240 (FIG. 2) to the address control 30 during the above-stated operation of reading out data from the buffer memory 40. The address control 30 generates the real address for the operand in quite the same way as described previously. In the case where the instruction under execution needs to read out the data for the operand real address from the buffer memory 40, the readout operation is conducted by quite the same procedures thus far described, whereupon a microinstruction having "1" in the operation end field 805 is read out and loaded into the control register 800 (FIG. 12), the E-stage ending upon executing this instruction. At this time, the operation end field 805 is transmitted to the I unit 20' through the line 80B and resets the FFs 238 and 239 having been set before.

Thus, the execution of the next macroinstruction is started again.

A concrete example will now be mentioned for better understanding of the embodiment stated above.

In the case of processing an MVC instruction, it is supposed that the data "X" and "Y" represented by the lower 4 bits of the first and second operand addresses are "2" and "6" in the decimal notation, respectively, and that the total length LF' of data is "16" in the decimal notation. Accordingly, the total length of data to be read out is 17 bytes.

After the end of the first decoding, the first operand address is set in the OARs 260 and 270. In addition, "0" is delivered onto the line 212A by the instruction stage control 212.

After the end of the succeeding second decoding, the second operand address is set in the OAR 240, and simultaneously, upon the end of the first A-stage, the output of the OAR 270 is set in the OAR 272 as it is. In addition, "1" is set on the line 212A by the stage control 212.

After the end of the succeeding second A-stage, the value of the OAR 240 is subjected to "+6" by the arithmetic circuit 242 because the readout length "5" is set in the align control 90' and provided on line 91'A, and the result is set in the OAR 244. Accordingly, the lower 4 bits of the OAR 244 becomes "12". At the same time, the arithmetic circuit 252 functions to perform "−6", and "10" is set in the register 254.

After the end of the succeeding second L-stage, the value of the OAR 244 is set in the OAR 246, and the value of the OAR 272 in the OAR 274. In addition, the value of the register 254 is set in the LFR 220. Accordingly, "12" is set in the lower 4 bits of the OAR 246 and "10" in the LFR 220, and they are delivered to the E-stage.

Since the first operand is not read out in the MVC instruction, the values of the OARs 264 and 266 are not employed. Therefore, the operations of these OARs pertaining to this instruction will not be described.

Regarding the alignment of data, the output OP code of the instruction register 210 is sent to the align control 90' through the line 21A, and the alignment direction is decoded by the decoder 98'. As regards this instruction, the decoder 98' provides "0". After the end of the second decoding, this value is set in the ALDR 99'. Simultaneously, the OP code is decoded by the decoder 230 in the decoding stage as to whether it is the disable overlap instruction or not. As a result, the decoder 230 provides "1" and sets the FF 238 in an intermediate stage of the first decoding stage. After the end of the first decoding, "1" is set in the register 232. Now that the FF 238 has become "1", the instruction stage control 212 functions so as to inhibit the decoding of the next instruction.

Since the FF 239 is held at the previous value or "0" at the time of the end of the second decoding stage, an output to a line 23A becomes "0". In the second A-stage, accordingly, the selector 100 (FIG. 1) selects the output 90'A of the ALDR 99' and delivers it onto the line 90"A. Since, at this time, the line 212A is set at "1", the selector 282 selects a line 240Z as indicated in FIG. 18. In other words, the second operand is selected.

Using the second operand address 20A and the decoding result "0" on the line 90"A, the address control 30 generates the second-operand real address. It reads out from the buffer memory 40 data of 16 bytes including data of 8 bytes whose leftmost address is the second-operand read address.

In the second A-stage, since the line 23A is "0", the selector 280 selects the content of a line 240Y and delivers it to the line 26A. In other words, the lower 4 bits of the second-operand address or "6" in this example are selected.

Likewise, since the line 23A is "10", the selector 284 selects the content of a line 260Y or the lower 4 bits of the first operand address, "2" in this example, and delivers it onto the line 24A.

In the SHBDCKT 93' within the align control 90', the selector 930' responds to the OP code on the line 20B to select a line 937'A as indicated in FIG. 10 and to provide data "Y−X" or the difference of the second and first operand virtual addresses. Since, in this example, Y=6 and X=2, the output of the line 937'A becomes "4". This output "4" is stored in the SHBREG 94', and is thereafter sent to the shift control circuit 95'. The output 90'B is selected by the selector 100, and is sent to the cycle shifter 50 through the line 90"B. Here, the data is cyclically shifted leftwards by the amount of 4 bytes. Accordingly, a part of the data assigned by the second-operand address is included in the 6 bytes extending from the third to eighth bytes as reckoned from the left end of data delivered from the cycle shifter 50. Two bytes on the left side of the data provided from the cycle shifter 50 are data which is not used for the execution.

On the other hand, in the FDLDCKT 91' within the align control 90', the selector 910' responds to the OP code on the line 20B for the MVC instruction and selects an output line 911'A of the MINDET 911' as indicated in FIG. 10. Since the MINDET 911' is supplied with "2" through the line 24A and with "16" through the line 25A, the output of the MINDET 911' becomes "5". This output is sent to the pattern generators 962' and 964' within the MPDCKT 96' and the I unit 20'. The selector 960' within the MPDCKT 96' responds to the OP code on the line 20B for the MVC instruction and selects an output line 966'A of the right shifter 966' as indicated in FIG. 10. The left pattern generator 962' responds to the applied data "5" and delivers a pattern "11111100" as indicated in FIG. 9. The right shifter 966' shifts this pattern rightwards a number given by the line 24A, "2" in the present example, and delivers a pattern "00111111". This output 90'C is selected by the selector 100, and is sent to the operand control 60 through the line 90"C. In response to the 8-bit pattern from the line 90"C, the operand control 60 cuts only two, first and second bytes of the output of the cycle shifter 50 consisting of 8 bytes and transmits data of the other 6 bytes to the ALU 70.

Thus, the ALU 70 stores therein data totaling 8 bytes as consist of the data of 6 bytes beginning from the second-operand address and both the remaining bytes of "0".

After the end of the second A-stage, the value of the register 232 is set in the register 234, and after the end of the second L-stage, the output of the register 234 sets the FF 239. Since, in this example, the register 232 is "1", the FF 239 is set at "1" after the end of the second L-stage. It is not reset until an EOP signal indicative of the end of the E-stage as applied from the control storage 80 becomes "1". Accordingly, when the E-stage is initiated, that is, after the second L-stage has ended, "1" is held on the line 23A.

The E-stage is executed as follows.

The OP code of the MVC instruction is sent from the I unit 20' to the control storage 80, and the front microinstruction of the microinstruction sequence for the execution of this MVC instruction is loaded into the CR 80. Thereafter, microinstruction within the sequence are successively read out in a predetermined sequence, to execute the MVC instruction. In initiating the execution, whether or not the MVC instruction requires a word overlap processing is discriminated in the I unit 20'. A circuit therefor is not illustrated for the sake of brevity. The result of the discrimination is transferred to the control storage 80. On the basis of this result, the control storage 80 proceeds to the branch of a different microinstruction.

When it has been discriminated that the MVC instruction is an instruction which does not require overlap processing, data "1001" is stored in the align field 806 of the subsequent microinstruction branch. In reading out data from the memory 10, this align field is decoded by the decoder 98. The decoded result is "0" as indicated in FIG. 17. This result is sent to the selector 100 through the line 90B. As the line 23A is "1", the line 90B is selected by the selector 100, and the data on this line is sent to the address control 30. Using the decoder result and the second-operand virtual address from the OAR 240, the address control 30 generates a second-operand read address. It reads out from the buffer memory 40 data of 16 bytes including data of 8 bytes whose leftmost address is the second-operand read address.

On the other hand, in the SHBDCKT 98 within the align control 90, the selector 930 provides the data "Y" in response to the align data "1001". This value is "12" in the present example. The output "12" is stored in the SHB REG 94, and is thereafter sent to the shift control circuit 95. The output 90'B of the circuit 95 is sent to the selector 100. As the line 23A is "1", the line 90'B is selected by the selector 100, the data of 16 bytes read out from the buffer memory 40 is cyclically shifted leftwards by the amount of 12 bytes by the cycle shifter 50 under the control of the shift control circuit 95.

On the other hand, in the FDLDCKT 91 within the align control 90, the selector 910 responds to the align data "1001" and selects an output line 911A of the MIN DET 911 as indicated in FIG. 17. Since "10" is applied to the MIN DET 911 from the LFR 220, the output of this circuit 911 becomes "7". This output is sent to the pattern generators 962 and 964 within the MPDCKT 96. In response to the align data "1001", the selector 960 within the MPDCKT 96 selects an output line 962A of the left pattern generator 962 as seen from FIG. 17. The left pattern generator 962 responds to the applied data "7" (which is "111" in the binary notation) and provides a pattern "11111111". This is set in the register 97. The output 90C of the register 97 is sent to the selector 100, and the output 90C is selected for a line 90"C as the line 23A is "1".

In response to the 8-bit pattern from the align control 90, the operand control 60 stores into the OBR 600 the data of 8 bytes in all as provided from the cycle shifter 50. Thus, the data of 8 bytes beginning from the second-operand address is stored in the OBR 600.

Thereafter, the instruction unit reduces the LF value in the LFR 220 to a value "2" which is obtained by subtracting "8" from "10". Further, it increases the values in the OARs 240 and 260 by "8" respectively. Thereafter, using the updated contents of the LFR and OARs, the readout of data is carried out in the same way as described above.

The above description is the outline of the processing of the MVC instruction which does not need the overlap processing.

In the case where the MVC instruction requires the overlap processing, data "0001" is stored in the align field 806 within the subsequent microinstruction branch. The selector 910 (FIG. 14) selects the output of the circuit 913, and delivers it as the readout data length. The selector 930 (FIG. 15) within the SHBD CKT 93 provides the data "Y'". The shift control circuit 95 controls the cycle shifter 50, and causes it to deliver the output of the buffer memory 40 without any shift or by shifting it 8 bytes, depending upon whether "Y'" is "0000" or "1000". The details of the other operations are similar in principle to those in the case where the overlap processing is not required, and hence, they are omitted from this description.

The data aligned as above described is subsequently written into the buffer memory 40 in the E-stage. In this case, a write address is applied from the OAR 274 through the selector 282 to the address control 30. The writing is executed in 8 bytes according to the known technique. The value of the OAR 274 is subjected to "+8" by the arithmetic circuit 276 every writing. In the address control 30, a write real address is generated and stored into the DAR 39 so as to effect the writing into the buffer memory 40.

Now, the operation of the present embodiment will be described as applied to a case of processing the decimal operation instruction. Let's consider a case where the first-operand length LF'1 is "15" in the decimal notation, while the second-operand length LF'2 is "12" in the decimal notation.

The decimal instruction differs from the MVC instruction in that both the first and second operands are read out from the main memory.

After the end of the first decoding stage, (first-operand address +LF'1) is set in the OARs 260 and 270. In addition, "0" is delivered onto the line 212A by the instruction stage control 212.

After the end of the succeeding second decoding, (second operand address +LF'2) is set in the OAR 240, and simultaneously, the content of the OAR 270 is set in the OAR 272 upon the end of the first A-stage. In addition, "1" is set on the line 212A by the control 212.

Since the readout length "7" is set on the line 91'A by the align control 90', a value with the value of the OAR 260 subjected to "−8" is obtained by the arithmetic circuit 262, and it is set in the OAR 264. At the same time, the arithmetic circuit 252 functions to subject the first-operand length to "−8", the result being set in the register 254. Accordingly, the first-operand length LF1 becomes "7". After the end of the succeeding second L-stage, the content of the OAR 272 is set in the OAR 274, that of the OAR 264 is set in the OAR 266, that of the OAR 244 is set in the OAR 246, and that of the register 254 is set in the LFR 220. Accordingly, (first-operand address +LF'1) is set in the DAR 274, (second-operand address +LF'2−8) is set in the OAR 266, and LF1 "7" and LF2 "4" are set in the LFR, and they are delivered to the E-stage.

Regarding the align control, the OP code within the I register 210 is decoded by the decoder 98'. In case of the decimal instruction, the decoder 98' provides "1". This value is set in the ALDR 99' after the end of the first decoding. The OP code within the I register 210 is also decoded by the decoder 230, which provides "1". This output sets the FF 238 in an intermediate stage of the first decoding. In addition, the register 232 is set after the end of the first decoding. Now that the FF 238 has become "1", the instruction stage control 212 functions so as to inhibit the decoding of the next instruction.

Since the FF 239 stores therein the previous value or "0" after the end of the first decoding, the signal on the line 23A becomes "0". Accordingly, the selector 100 selects the output 90'A of the ALDR 99' in the succeeding first A-stage (equal to the second D-stage). The result is sent to the address control 30.

Since, at this time, "0" is delivered on the line 212A, the selector 282 selects the line 260Z or (first-operand address +LF1). The address control 30 generates the second-operand real address in response to the signal from the selector 282 and the output of the decoder 98', and data of 16 bytes including data of 8 bytes whose rightmost address is the second-operand real address is read out from the buffer memory 40.

In the first A-stage, the selector 284 delivers the data of the line 260Y, i.e., selectively the lower 4 bits of (first-operand address +LF1), onto the line 24A.

In the SHBCKT 98' within the align control 90', the selector 930' responds to the OP code for the decimal instruction on the line 20B and the signal "0" on the line 212A and provides the data of the line 937'A or "X+9" as indicated in FIG. 10. This output is stored in the SHB REG 94', and is thereafter sent to the shift control circuit 95'. The output is sent to the selector 100 through the line 90'B and is selected there. The output of the selector 100 is sent to the cycle shifter 50 through the line 90"B. The data of 16 bytes including the first operand as previously read is cyclically shifted leftwards by the amount of "X+9" bytes by means of the cycle shifter 50.

On the other hand, in the FDLDCKT 91' within the align control 90', the selector 910' responds to the OP code on the line 20B and the signal "0" on the line 212A and selects the output line 915'A of the MINDET 915' as indicated in FIG. 10. The output of 915'A is sent to the pattern generators 962' and 964' within the MPDCKT 96' and to the instruction unit 20'. Since, in this example, LF'1 is "15", "7" is delivered onto the line 915'A.

In response to the OP code on the line 20B and the signal "0" on the line 212A, the selector 960' within the MPDCKT 96' selects the output line 964'A of the right pattern generator 964' as indicated in FIG. 10. The output of the selector 960' is sent to the selector 100 through the line 90'C and is selected there, whereupon it is sent to the operand control 60 through the line 90"C.

The operand control 60 masks the output of 8 bytes from the cycle shifter 50 in response to the 8-bit pattern on the line 90"C, and thereafter sends the resulting data to the ALU 70. Thus, the first operand is sent to the ALU 70.

Regarding the second operand, processings similar to the first decoding stage, the first A-stage and the first L-stage above stated are carried out.

Since the output from the I register 210 onto the line 21A is the OP code for the decimal instruction as in the case of the second decoding stage, the output of the decoder 98' becomes "1". Further, as explained before, "1" is set on the line 212A after the end of the second decoding. Accordingly, the selector 282 selects the line 240Z or (second-operand address +LF'2) and delivers it to the line 20A as indicated in FIG. 18. In the first A-stage, the selector 280 selects the line 240Y, in other words, the lower 4 bits of (second-operand address +LF'2).

In the SHBCKT 98' within the align control 90', the selector 930' responds to the OP code on the line 20B and the signal "1" on the line 212A and selects the line 937'A as indicated in FIG. 10. As a result, a signal "Y+9" is provided from the selector 930'.

In the FDLDCKT 91', the selector 910' selects the output line 917'A of the MINDET 917' as indicated in FIG. 10. The selector 960' within the MPDCKT 96' selects the output line 964'A of the right pattern generator 964' as indicated in FIG. 10.

In this manner, the second operand is also sent to the ALU 70.

At this time, the length LF1 is set at "7" and the length LF2 at "4", and the remaining operands are read out by microinstructions.

After the end of the second A-stage, the value of the register 232 is set in the register 234, and after the end of the second L-stage, the output of the register 234 sets the FF 239. Also in this case, the content of the register 232 is "1", so that the FF 239 is set to "1" after the end of the second L-stage. The FF 239 is not reset until the EOP signal from the control storage 80 as indicates the end of the E-stage becomes "1". Accordingly, when the E-stage is initiated, "1" is continuously delivered to the line 23A. In a microinstruction sequence for reading out data represented by the second-operand address, "1110" is stored in the align field. Accordingly, the selector 910 selects the line 917A. In the present example, the line 917A is supplied from the circuit 917 with binary data corresponding to "3". Accordingly, the second operand having a length of 4 bytes within the buffer memory 40 and from the second-operand address OAR 246 is read out. This second operand is cyclically shifted leftwards by an amount corresponding to the data "Y+9" by means of the cycle shifter 50. In the SHBDCKT 93 shown in FIG. 15, data from the selector 930 is provided. The data "Y+9" is a shift magnitude necessary and sufficient for delivering from the cycle shifter 50 that 8-byte data in the 16-byte data read out from the buffer memory 40 whose rightmost end is the second-operand address OAR 246. The data of the length of 8 bytes is sent to the operand control 60. The selector 960 (FIG. 16) in the circuit 60 selects and delivers the output of the right pattern generator 964. The operand control 60 accordingly provides data consisting of significant data having a number of bytes equal to the fetch data length provided by the selector 910 (FIG. 14) in the data of 8 bytes whose rightmost address is the second-operand address, all the other bytes being "0". This data is sent to the ALU 70. Thereafter, the first-operand address is sent to the address control from the instruction unit 20', and the first-operand real address is generated likewise to the case of the second operand so as to perform the readout of data. Data "1101" is stored in the align field within a microinstruction sequence for the processing of the first operand. The selector 930 (FIG. 15) accordingly provides data "X+9". Thereafter, the cycle shifter 50 and the operand control 60 are controlled by the align control 90 similarly to the case of the second operand. The first operand read out and the second operand previously read out are subjected to a predetermined operation in the ALU 70, whereupon the result is stored in the buffer memory 40 and the main memory 10. A store address at this time is supplied from the DAR 39 (FIG. 4) within the address control 30. In this way, the processing of the decimal operation instruction ends. It is the same as in the case of the MVC instruction that a store address at this time is applied from the OAR 274. However, the arithmetic circuit 276 subjects th value of the OAR 274 to "−8" at every writing.

As set forth above, according to this invention, there can be provided a very simple data processor which carries out the alignment and selection of data required in the processings of various instructions. This invention is not restricted to the foregoing embodiment, but covers modifications readily accomplished by one skilled in the art within the description of the following claims.

What is claimed is:

1. A data processing system in which execution of each macroinstruction is divided into a plurality of stages, comprising:

a data storage;

instruction means connected to said data storage for sequentially decoding each macroinstruction received from said data storage to control execution of those stages preceding the last stage thereof;

control storage means connected to said instruction means for providing a microinstruction sequence in response to an operation code of the decoded macroinstruction received from said instruction means to control execution of the last stage thereof;

first and second register means connected to said instruction means for storing a fetch front address and a length of data value to be fetched, respectively, for the decoded macroinstruction, said fetch front address and said length of data value initially being provided by said instruction means as a result of decoding of each macroinstruction, and means for renewing the fetch front address and length of data value after each read-out operation performed for the decoded macroinstruction, so that the renewed fetch front address and length of data value respectively manifest a fetch front address and a length of a remaining part of said data to be assessed;

read out means connected to said data storage and said instruction means for reading out a data block of a predetermined length and located between two address boundaries in said data storage which includes said fetch front address in said first register means, means for controlling said read-out so that it is performed first during a predetermined stage preceding the last stage of execution of a macroinstruction in order to fetch a first data block corresponding to the fetch front address initially stored in the first register means, and thereafter during the last stage in order to fetch a second data block corresponding to the renewed fetch front address;

first align control means connected to said instruction means for providing a first shift amount and a first mask position signal when said first data block is fetched from said data storage, including first means responsive to the operation code of the decoded macroinstruction and the initially provided fetch front address for providing said first shift amount and second means responsive to the initially provided data length, the initially provided fetch front address and the operation code for providing said first mask position signal;

second align control means connected to said instruction means for providing a second shift amount and a second mask position signal when the second data block is fetched from said data store, including third means responsive to an align field provided in a microinstruction and the renewed fetch front address for providing said second shift amount, and fourth means responsive to the renewed data length, the renewed fetch front address and said align field for providing said second mask position signal; and data shifting means connected to said data storage and said first and second align control means for shifting the first and second data blocks read out of said data storage in accordance with said first and second shift amounts, respectively, and for masking the shifted first and second data blocks in accordance with said first and second mask position signals, respectively.

2. A data processing system according to claim 1, wherein said data storage comprises a main storage and data buffer, said data buffer comprising two banks for storage of data; and said read-out means including means for fetching first and second parts of the first or second data blocks, respectively, from a different one of the two banks, said first and second parts respectively having a length of half of the predetermined length of the data block; and said data shifting means including means for shifting the first and second parts together and for thereafter providing part of the shifted data which has a length of half of the predetermined length as said shifted data, and means for masking the shifted data to provide the masked data as an output of said data shifting means.

3. A data processing system according to claim 1, wherein said first means includes means for generating different first shift amounts in response to the initially provided fetch front address and means for selecting one of the different first shift amounts in response to the operation code, and said third means includes means for generating different second shift amounts in response to the renewed fetch front address and means for selecting one of the different shift amounts in response to the align field.

4. A data processing system according to claim 3, further comprising means for storing a store front address used for storing the resultant data obtained from the executed macroinstruction in said data storage, said store front address initially being provided by said instruction means as a result of decoding of each macroinstruction and thereafter being renewed after each storing operation performed for the decoded macroinstruction, so that the renewed store front address manifests a front address of a remaining part of said resultant data to be stored; wherein
part of the different first shifts are dependent on a first difference between the initially provided fetch front address and the initially provided store front address, and part of the different second shift amounts are dependent on a second difference between the renewed fetch front address and the renewed store front address.

5. A data processing system according to claim 1, wherein said second means comprises:
means for determining a first length of effective data within said first data block in response to the initially provided data length and the operation code resulting from decoding of said macroinstruction in said instruction means; and
means for generating the first mask position signal in response to the initially provided fetch front address, the first effective data length and the operation code; and
characterized in that the fourth means comprises:
means for determining a second length of effective data within said second data block in response to the renewed data length and the align field derived from said microinstruction sequence; and
means for generating the second mask position signal in response to the renewed fetch front address, the second effective data length and the align field.

6. A data processing system according to claim 5, wherein said first effective length determining means comprises means for providing different first effective lengths in parallel in response to the initially stored data length, and means for selecting one of said different first effective lengths in response to the operation code; and in that said second effective length determining means comprises means for providing different second effective lengths in parallel in response to the renewed data length, and means for selecting one of the different second effective lengths in response to the align field.

7. A data processing system according to claim 6, wherein said first effective length determining means further comprises means for providing a constant value as part of the different first effective lengths; and said second effective length determining means further comprises means for providing a constant value as part of the different second effective lengths.

8. A data processing system according to claim 5, where said first mask position signal generating means comprises first right pattern generating means for generating first plural bits which comprise a first partial number of bits located in the right part thereof and corresponding to a non-masking state, said first partial number being equal to the first effective length, and first left pattern generating means for generating second plural bits which comprise a second partial number of bits located in the left part thereof and corresponding to a non-masking state, said second partial number being equal to the first effective number, and first right shifter means for shifting the first plural bits to the right by an amount depending on the initially provided fetch front address, and means for selecting in response to the operation code one of the outputs of said first right pattern generating means, said first left pattern generating means and said first right shifter means.

9. A data processing system according to claim 8, wherein said second mask position signal generating means comprises second right pattern generating means for generating third plural bits which comprise a third partial number of bits located in the right part thereof and corresponding to a non-masking state, said third partial number being equal to the second effective length, and second left pattern generating means for generating fourth plural bits which comprise a fourth partial number of bits located in the left part thereof and corresponding to a non-masking state, said fourth partial number being equal to the second effective length, and second right shifter means for shifting the fourth plural bits to the right by an amount depending on the renewed fetch front address, and means for selecting in response to the align field one of the outputs of said second right pattern generating means, said second left pattern generating means and said right shifter.

10. A data processing system which comprises:
(a) means for storing a plurality of macroinstructions and data, said macroinstructions including both enable overlap and disable overlap instructions;
(b) instruction means for determining a starting address of data participating in the execution of a macroinstruction which is read out from said storing means and for determining a length indication of the entire length of said data in response to said readout macroinstruction, and including means for determining from said read-out macroinstruction whether it is an enable overlap instruction requiring a single operand access or a disable overlap instruction requiring a pair of operand accesses, and wired logic means responsive to said macroinstruction for providing align data for the single operand to be accessed by an enable overlap instruction or the first operand to be accessed by a disable overlap instruction;

(c) address control means responsive to addresses from said instruction means for reading out macroinstructions from said storing means to said instruction means for reading out said data in the form of operands from said storing means based on the thus-determined address and entire length of said data;

(d) shifting means connected to said storing means for shifting the read-out data from said storing means by a quantity determined by said macroinstruction;

(e) masking means connected to said shifting means for masking part of said shifted data in accordance with said macroinstruction; and (f) control storage means connected to said instruction means for storing a microinstruction sequence for controlling execution of said macroinstruction and for putting out in sequence predetermined microinstructions in response to control from said instruction means on the basis of the read-out macroinstruction, said microinstructions including an align field for controlling said instruction means, said shifting means and said masking means;

(g) said shifting means including first align control means connected to said instruction means and responsive to an indication from said determining means in said instructions means that said read-out macroinstruction is an enable overlap instruction for determining a first shift quantity in response to said starting data address as determined by said instruction means and said align data provided by said wired logic means, and second align control means connected to said instruction means and said control storage means and responsive to an indication from said determining means in said instruction means that said read-out macroinstruction is a disable overlap instruction for determining a second shift quantity for a second operand access in response to a data address from said instruction means for said second operand and said align field provided in said microinstruction;

(h) selector means responsive to said instruction means indicating an enable overlap instruction for connecting said first align control means to said shifting means and masking means, and responsive to said instruction means indicating a disable overlap instruction for connecting said first and second align control means in sequence to said shifting means and masking means for respective shifting and masking of said pair of operands received from said storing means; and (i) said masking means including means connected to said first and second align control means for putting out mask pattern signals indicating the position of said part of said data to be masked.

11. A data processing system as set forth in claim 10, wherein said instruction means includes determining means for determining the length of said operand data to be read out from said storage means at the subsequent read-out operation, and said masking means includes means for providing different mask pattern signals in response to different outputs of said determining means.

* * * * *